(12) United States Patent
Abeln et al.

(10) Patent No.: US 7,472,467 B2
(45) Date of Patent: Jan. 6, 2009

(54) METHOD FOR FRICTIONALLY CONNECTING THE FRONT SURFACES OF TWO MACHINE COMPONENTS FOR TRANSMITTING HIGH TORQUES OR TRANSVERSE FORCES

(75) Inventors: Tobias Abeln, Stuttgart (DE); Ulrich Klink, Neuffen (DE)

(73) Assignee: Gehring GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/638,503

(22) Filed: Dec. 14, 2006

(65) Prior Publication Data

US 2007/0140785 A1 Jun. 21, 2007

(30) Foreign Application Priority Data

Dec. 19, 2005 (DE) .................. 10 2005 062 522

(51) Int. Cl.
*B23P 13/04* (2006.01)

(52) U.S. Cl. ......................................................... 29/557
(58) Field of Classification Search .................. 29/557, 29/525.14, 428, 505, 416; 403/282
See application file for complete search history.

(56) References Cited

FOREIGN PATENT DOCUMENTS

DE 199 31 077 2/1997

OTHER PUBLICATIONS

J. Steffen "Der Laser in der Fertigungstechnik", Technische Rundschau, vol. 37, pp. 21-24, 1988.
F. Henari, W. Blau "Excimer-Laser Surface Treatment of Metals for Improved Adhesion", Applied Optics, vol. 34, No. 3, Jan. 20, 1995.

*Primary Examiner*—John C Hong
(74) *Attorney, Agent, or Firm*—Paul Vincent

(57) ABSTRACT

Method for frictionally connecting the front surfaces of two machine components (1', 2"; 2', 3"; 3', 4") for transmitting high torques or transverse forces, wherein elevations (20) are provided on one (1', 2', 3') of the surfaces (1', 2"; 2', 3"; 3', 4") to be connected, which are harder than the material of the other surface.

3 Claims, 4 Drawing Sheets

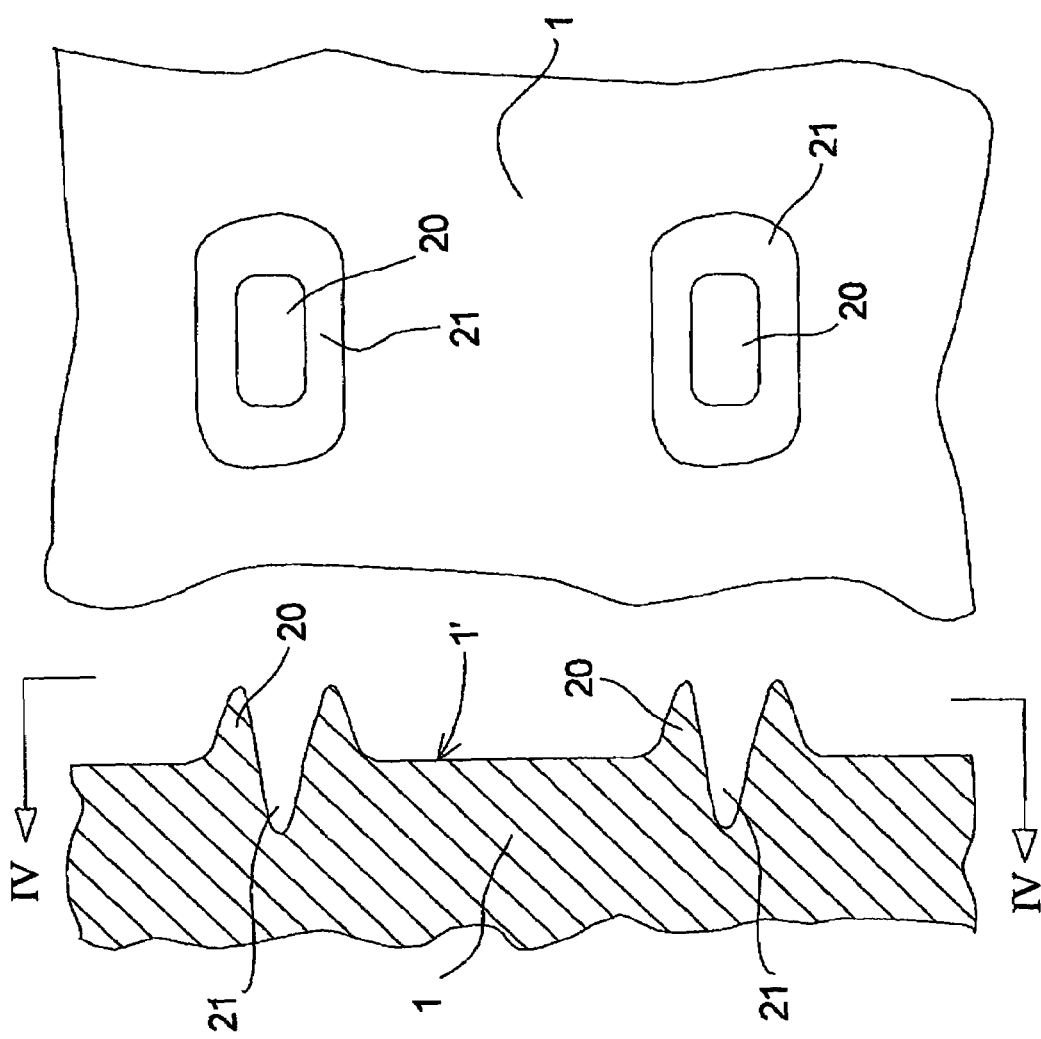

METHOD FOR FRICTIONALLY CONNECTING THE FRONT SURFACES OF TWO MACHINE COMPONENTS FOR TRANSMITTING HIGH TORQUES OR TRANSVERSE FORCES

This application claims Paris Convention priority of DE 10 2005 062 522.3 filed Dec. 19, 2005 the complete disclosure of which is hereby incorporated by reference.

BACKGROUND OF THE INVENTION

The invention concerns a method for frictionally connecting the front surfaces of two machine components for transmitting high torques or transverse forces, and a structural component which is formed from these machine components and produced in accordance with this method.

Frictional connections of two machine component surfaces are used in many fields of mechanical engineering for transmitting transverse forces or torques. The force that can be transmitted is thereby substantially produced by the surface pressure and the resulting friction between the connected surfaces. Such connections are important mainly in drive technology, e.g. for driving auxiliary units. The power that can be transmitted is often limited by the force that can be transmitted through contact between the two abutting surfaces.

Such connections are mostly realized through force/friction fit in the form of shaft/hub connections. Depending on the geometry of the active surfaces, these are front, conical or cylindrical compression joints and associated friction fit combinations (flanges, clamping elements, screw heads). All of these connections are based on surface contact. The generated frictional force depends on different factors, e.g. on the type of joint, the surface roughness and the surface compression which preferably acts perpendicularly to the surfaces.

Hard particles are conventionally introduced between the two surfaces to be connected in order to increase friction. A micro-positive locking is produced in the area where the hard particles penetrate into the material of the softer surfaces to be connected. The increase in friction results from the resistance of the material of the surfaces relative to grooves due to the hard particles. Such connections are disclosed e.g. in DE 31 49 596 A1, DE 101 48 831, DE 18 16 854 A1 and DE 23 46 275 C2. Resilient-elastic foils (diamond foils) are also conventionally used into which particles of hard material (diamond) are embedded (EP 0 961 038 B1, EP 1 564 418 A1). They are disposed between the surfaces to be connected.

The production of these foils, in particular, of the diamond particles embedded in the foil, is expensive. The method for producing such connections and the constructive considerations are complex.

It is therefore the underlying purpose of the invention to create a method for producing frictional connections between the front surfaces of two machine elements for transmitting high torques, which is considerably simpler than conventional methods and also produces structural components of two machine elements for transmitting high torques, which can be produced in a considerably easier and less expensive fashion than up to now.

SUMMARY OF THE INVENTION

In accordance with the invention, this is achieved by the features of the independent claims. The invention moreover concerns advantageous further developments thereof.

The inventive method is extremely simple, since there are conventional methods for producing depressions (micro-shaped pockets) and thereby also elevations, surrounding them, in metallic surfaces through suitable laser radiation systems, although the elevations are subsequently removed again through honing. The micropockets that remain in the surfaces improve the tribological properties, i.e. reduce friction (compare DE 20 2005 011 772 U, DE 20 2005 005 905 U, EP 0 565 742 B1; DE 43 16 012 C2, DE 295 06 005 U; EP 1 275 864 B1, and compare also U. Klink and G. Flores, Laser-Strukturieren von Zylinderlaufbahnen, 9. Internationales Feinbearbeitungskolloquium, 12. to 14. 10.1999, Braunschweig; Vulkan-Verlag, Essen (1999), ISBN 3-8027-8644-0; T. Abeln and U. Klink, Laserstrukturieren zur Verbesserung der tribologischen Eigenschaften von Oberflächen, in: Dausinger, F. et al., Stuttgarter Lasertage, 2001, pages 61 to 64). This technology for laser structuring supplements the present description in view of the applied devices and is hereby incorporated by reference.

It has turned out that the simple method in accordance with the invention transmits much higher torques than conventional devices for a given pressure surface and contact pressure. It is thereby also possible to transmit transverse forces between flat, non-rotating and non-rotationally symmetric surfaces. The inventive content and quality of the method therefore greatly exceed the conventional improvement of the adhesive force of bearing shells in connecting rod eyes, as is disclosed in EP 1 420 177.

One embodiment of the invention and its advantageous further developments are described below with reference to the enclosed drawings.

BRIEF DESCRIPTION OF THE DRAWING

FIG. 3 shows the front surface 1' of the crankshaft 1 in accordance with FIG. 2, also in an enlarged scale;

FIG. 4 shows a top view of the front surfaces 1' in the direction of arrows IV-IV in FIG. 3;

DESCRIPTION OF THE PREFERRED EMBODIMENT

Figure 1:
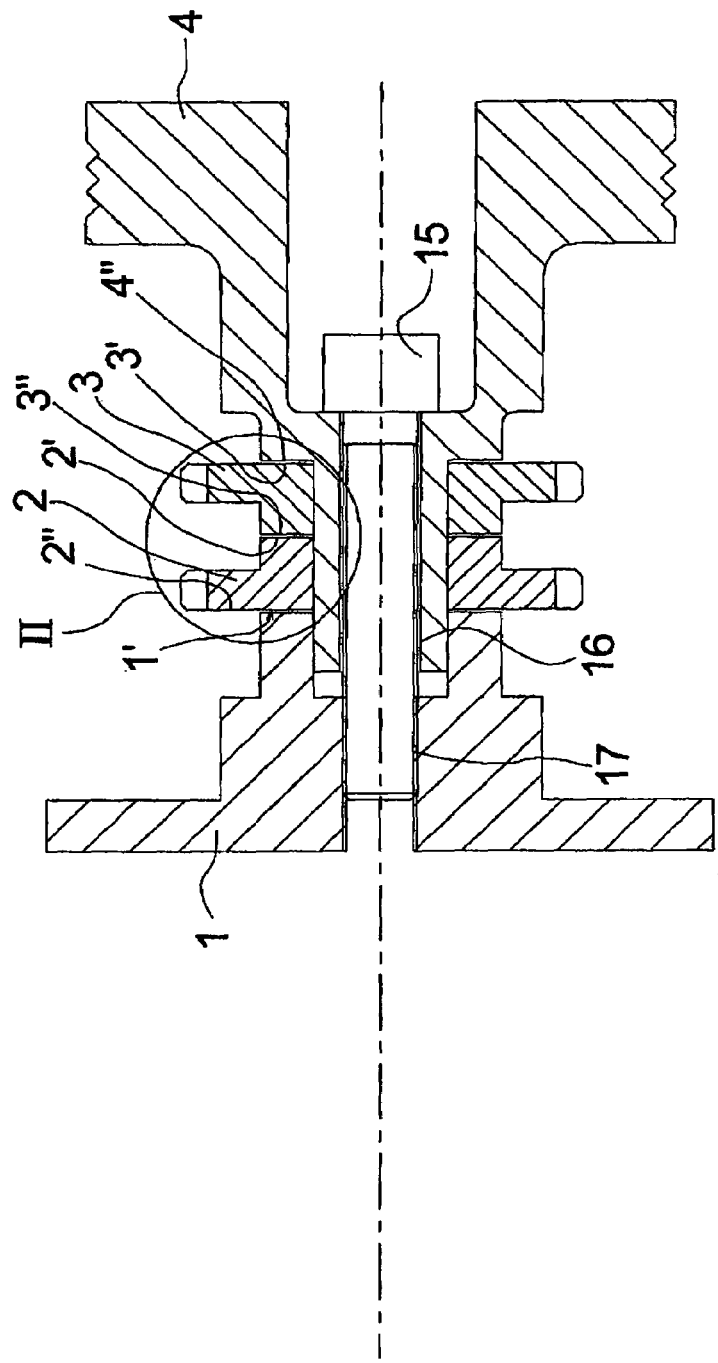
FIG. 1 shows a connection between a crankshaft and a pulley produced in accordance with the inventive method.
Figure 2:
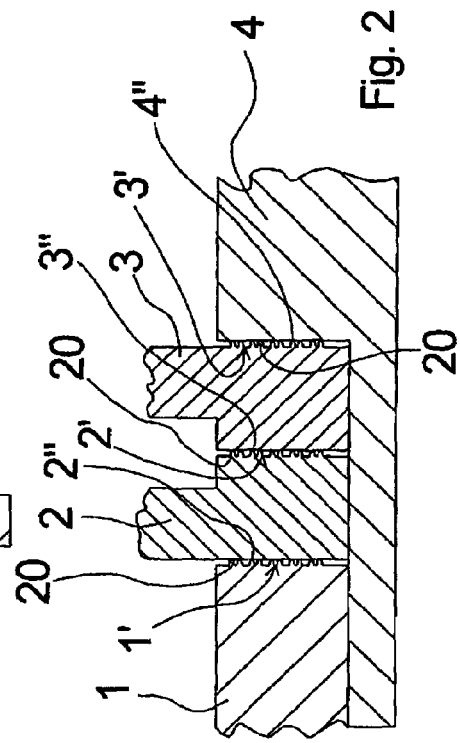
FIG. 2 shows the detail designated with II in FIG. 1 in an enlarged scale.
Figure 5:
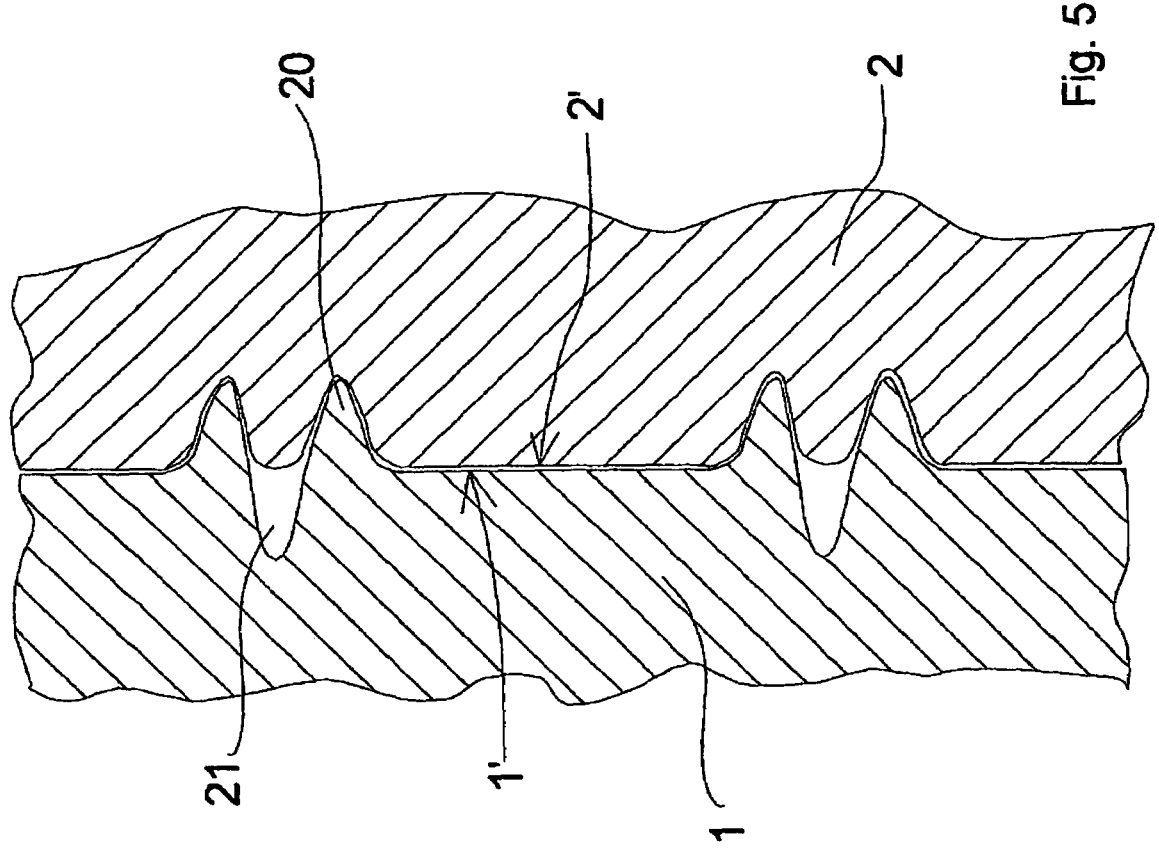
FIG. 5 shows the connection between the front surface 1' of the crankshaft 1 and the front surface 2" of the front surface 2 on an enlarged scale in correspondence with FIG. 3.

FIGS. 1 and 2 show the connection of the end of a crankshaft 1 (first machine component), two pinions 2 and 3 and a pulley 4 (further machine components) to a structural component. The front surface 1' of the crankshaft 1, the front surface 2' of the pinion 2 and the front surface 3' of the pinion 3 have elevations 20 (FIGS. 2 and 3). When the crankshaft 1, the pinions 2, 3 and the pulley 4 are tightened perpendicularly to the above-mentioned surfaces using a hexagon socket screw 15 which extends through a bore 16 in the axial projection of the pulley 4 and engages in a thread 17 in the crankshaft 1 (FIG. 1), the hardened elevations 20 dig into the smooth, non-hardened front surface 2" of the pinion 2, the smooth, non-hardened front surface 3" of the pinion 3, and the smooth, non-hardened front surface 4" of the pulley 4 and thereby form a micro-positive locking in each case, which accepts transmission of torques which are considerably larger than those realized by pressing smooth surfaces against each other with the same force.

Figure 6:
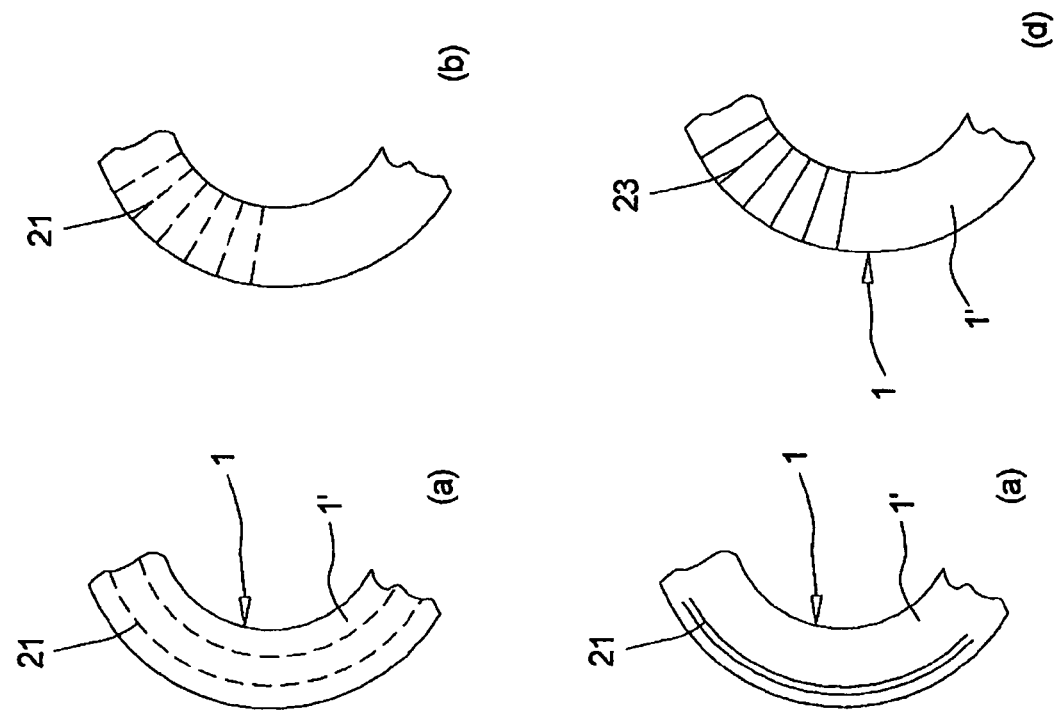
FIG. 6 shows further geometries for arranging the elevations on a front surface.

The hardened elevations 20 are mounted e.g. to the front surface 1' through laser structuring in FIG. 3, i.e. through high-energy, focused laser beams which are directed onto the surface to be processed, using e.g. a YAG laser (yttrium aluminium garnet laser) (compare e.g. the schematic representation of such a laser in Popraw, R., Lasertechnik für die Fertigung, Spinger-Verlag Berlin/Heidelberg 2005, page 232' and the above-mentioned references to patent literature). A surface 1' may be exposed to a laser of his type to produce e.g. elongated pockets 21 (see FIGS. 3 and 4). Such structures may be introduced in different patterns, e.g. also with dots. In this case, the pockets 22 are round. These round or elongated pockets may, in turn, be mounted linearly (e.g. as grooves 23) or in circles in different geometries (FIG. 6).

When the elevations 20 are introduced by laser radiation, the elevations are produced by point-focus melting of the material of the surfaces that warps at the edges, subsequently solidifies and hardens through cooling. The high concentration of energy at the focus of the laser beam melts and hardens the elevations of the material in the otherwise softer and smooth surface.

In consequence thereof, when pressing these molten and hardened elevations 20 of the surfaces 1', 2', 3' against each other (FIG. 1), they dig into the smooth, non-hardened, softer surfaces 2", 3", 4" that serve as a partner for forming structural components, thereby forming a connection that is resistant to torques and transverse forces, respectively. This connection may be released again.

The invention extends beyond the above-described preferred embodiment. It comprises not only elevations which are produced through laser structuring, i.e. in principle through point-focus melting and hardening for digging into a softer surface. The elevations may also be introduced through an electron beam or mechanically. It is important that they are harder than the "soft" surface of the respectively other machine component.

LIST OF REFERENCE NUMERALS 1 crankshaft
1' front surface of 1 provided with elevations 20
2 pinion
2' front surface of 2 provided with elevations 20
2" smooth front surface of 2
3 pinion
3' front surface of 3 provided with elevations
3" smooth front surface of 3
4 pulley
4" front surface of 4 provided with elevations 20
15 hexagon socket screw
16 bores
17 thread
20 elevations in 1', 2', 3'
21 elongated pockets
22 round pockets
23 grooves

We claim:

1. A method for frictionally connecting a first front surface of a first machine component to a second front surface of a second machine component for transmitting high torques or transverse forces, the method comprising the steps of:
   disposing elevations onto the first front surface through melting and hardening small areas of a first front surface material; and
   pressing together the first and the second machine components such that the hardened elevations in the first front surface penetrate into a softer second front surface material of the second front surface thereby forming a connection between the first and the second machine components that is resistant to torques and transverse forces.

2. The method of claim 1, wherein the front surfaces are flat or conical.

3. A method for frictionally connecting a first front surface of a first machine component to a second front surface of a second machine component for transmitting high torques or transverse forces, the method comprising the steps of:
   disposing elevations onto the first front surface through melting and hardening small areas of a first front surface material, wherein the elevations are disposed through point-focus or linear loading using a focussed laser beam to produce laser structuring; and
   pressing together the first and the second machine components such that the hardened elevations in the first front surface penetrate into a softer second front surface material of the second front surface, thereby forming a connection between the first and the second machine components that is resistant to torques and transverse forces.

* * * * *